US008433366B2

(12) United States Patent
Hertlein et al.

(10) Patent No.: US 8,433,366 B2
(45) Date of Patent: Apr. 30, 2013

(54) WIRELESS DEVICE AND ASSEMBLY

(75) Inventors: Robert Hertlein, San Diego, CA (US);
Slim Souissi, San Diego, CA (US);
Rahul Chaturvedi, San Diego, CA (US); Clint Wilber, San Diego, CA (US)

(73) Assignee: Novatel Wireless, Inc., San Diego, CA (US)

( * ) Notice: Subject to any disclaimer, the term of this patent is extended or adjusted under 35 U.S.C. 154(b) by 809 days.

(21) Appl. No.: 12/350,186

(22) Filed: Jan. 7, 2009

(65) Prior Publication Data
US 2010/0029330 A1 Feb. 4, 2010

Related U.S. Application Data

(63) Continuation-in-part of application No. 29/322,110, filed on Jul. 29, 2008, now abandoned.

(51) Int. Cl.
*H04B 1/38* (2006.01)
(52) U.S. Cl.
USPC ............................................ 455/558; 439/638
(58) Field of Classification Search .................. 455/558,
455/575.7, 556.1, 557, 414.1, 432.1; 439/630,
439/638, 76.1, 945, 159, 325, 352; 343/702,
343/906
See application file for complete search history.

(56) References Cited

U.S. PATENT DOCUMENTS

| | | |
|---|---|---|
| 5,155,663 A | 10/1992 | Harase |
| D361,332 S | 8/1995 | Scheid |
| D367,653 S | 3/1996 | Tajima |
| 6,043,780 A * | 3/2000 | Funk et al. ..................... 343/702 |
| D427,167 S | 6/2000 | Iwasaki |
| D431,035 S | 9/2000 | Lehtomaki |
| 6,149,450 A * | 11/2000 | Gastineau ..................... 439/325 |
| 6,457,647 B1 | 10/2002 | Kurihashi |
| 6,529,743 B1 * | 3/2003 | Thompson et al. ........... 455/557 |
| 6,567,273 B1 | 5/2003 | Liu |
| D475,701 S | 6/2003 | Kasuya |
| 6,577,500 B2 | 6/2003 | Paredes |
| D489,714 S | 5/2004 | Yin |
| D498,788 S | 11/2004 | Lubking |
| D514,108 S | 1/2006 | Bahar |
| 7,059,913 B1 * | 6/2006 | Chen ............................ 439/638 |
| 7,125,258 B2 | 10/2006 | Nakakubo |
| 7,156,700 B2 * | 1/2007 | Inaba ........................... 439/630 |
| D553,130 S | 10/2007 | Fiorentino |
| D556,763 S | 12/2007 | Hsiau |
| D558,199 S | 12/2007 | Fiorentino |
| D560,717 S | 1/2008 | Robertson |
| D564,521 S | 3/2008 | Liu |
| 7,349,719 B2 * | 3/2008 | Buniatyan .................... 455/557 |
| 7,371,089 B2 * | 5/2008 | Cheng .......................... 439/159 |
| D571,809 S | 6/2008 | Liu |

(Continued)

OTHER PUBLICATIONS

International Search Report for PCT Application No. PCT/US2009/032483 dated Mar. 13, 2009.

*Primary Examiner* — Lana N Le
*Assistant Examiner* — Golam Sorowar
(74) *Attorney, Agent, or Firm* — AlbertDhand LLP

(57) ABSTRACT

A system for wireless communication comprises a first communication device having a first interface for interfacing with a host device and a second interface; and a second communication device configured to be coupled to the second interface of the first communication device. The first communication device and the second communication device, when coupled, form a substantially integrated device.

20 Claims, 4 Drawing Sheets

U.S. PATENT DOCUMENTS

| | | |
|---|---|---|
| 7,411,284 B2 | 8/2008 | Iwasaki |
| 7,416,132 B2 | 8/2008 | Takiar |
| D576,626 S | 9/2008 | On |
| 7,460,076 B2 | 12/2008 | Hayes |
| 7,489,027 B2 | 2/2009 | Iwasaki |
| D591,754 S | 5/2009 | Hwangbo |
| 2002/0101377 A1* | 8/2002 | Crawford ................. 343/702 |
| 2006/0149855 A1* | 7/2006 | Fukuda ........................ 710/2 |
| 2009/0004921 A1 | 1/2009 | Hubert |

* cited by examiner

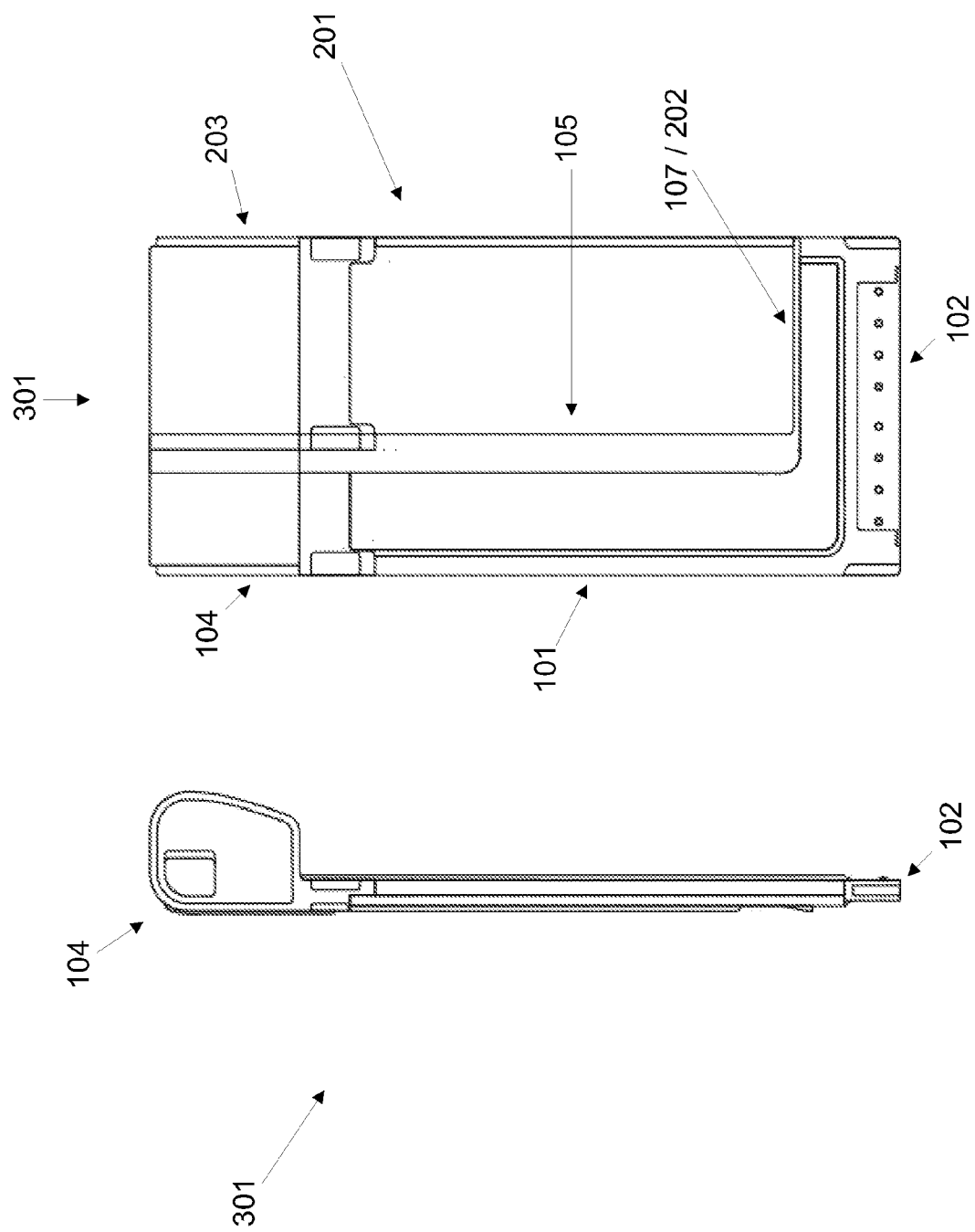

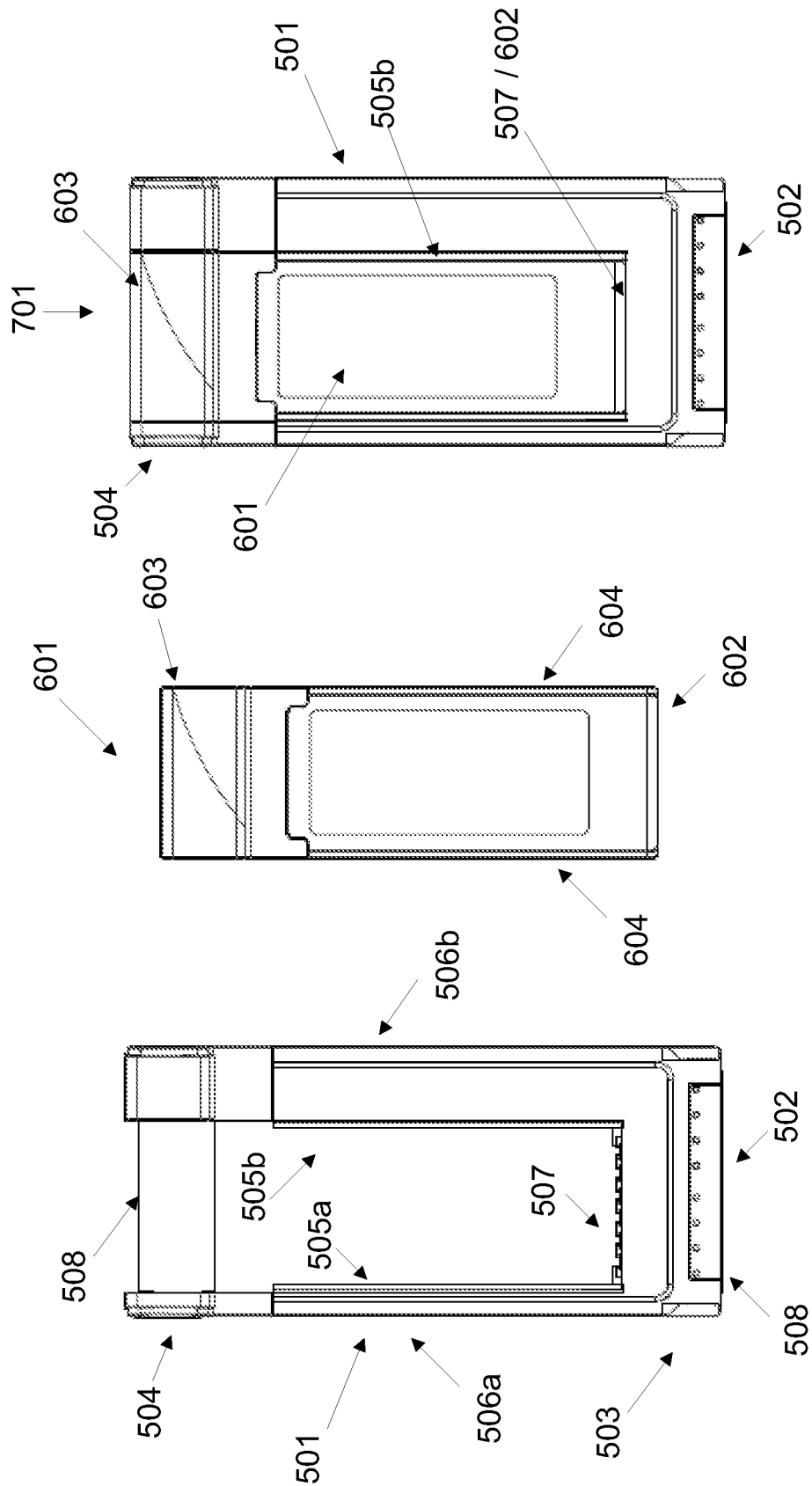

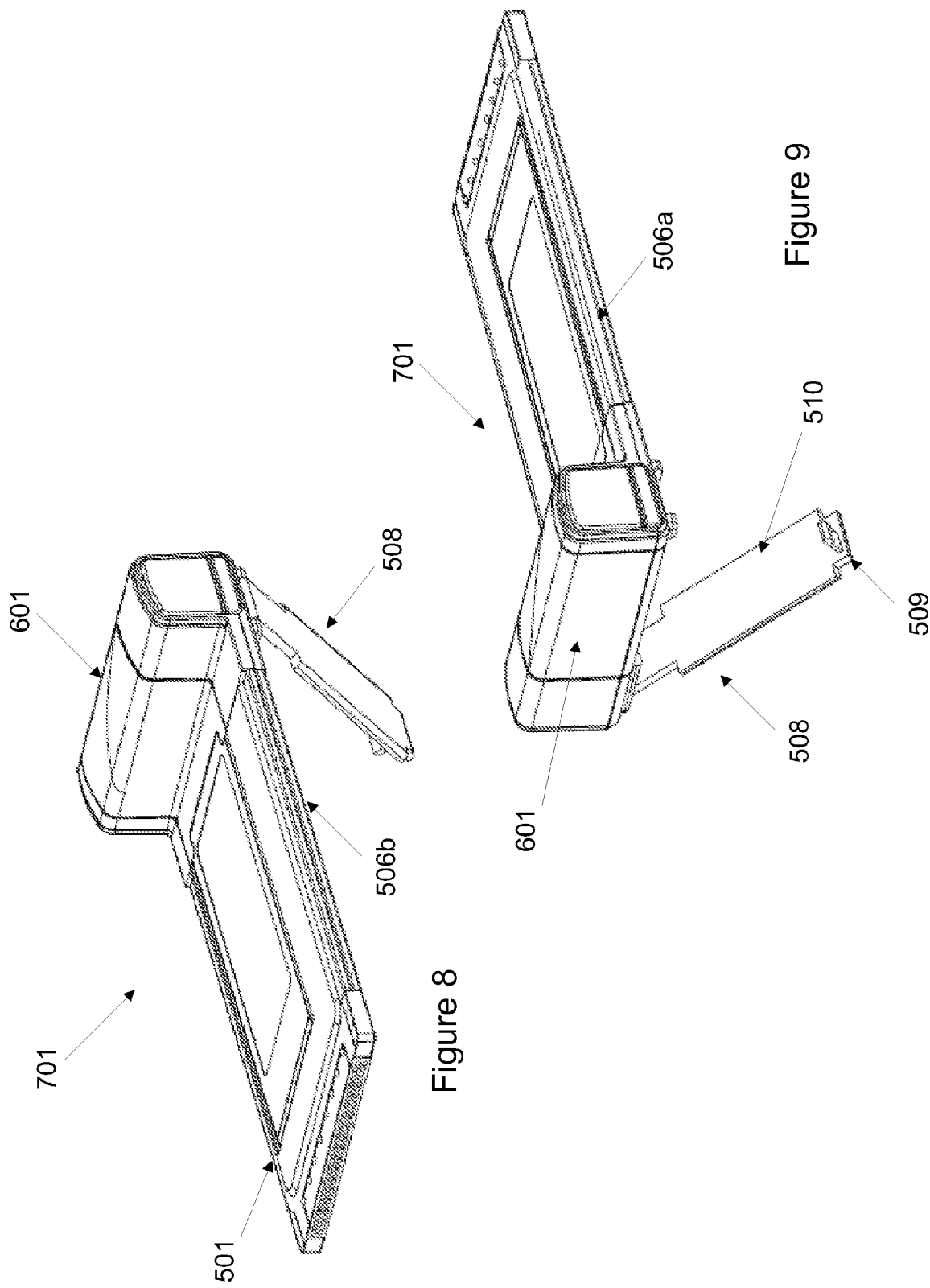

WIRELESS DEVICE AND ASSEMBLY

RELATED APPLICATIONS

This application claims the benefit of priority under 35 U.S.C. §120 to U.S. Design patent application Ser. No. 29/322,110, filed Jul. 29, 2008.

FIELD OF THE INVENTION

The present invention relates generally to the field of wireless communication. In particular, the present invention relates to a wireless communication devices configured to accommodate a second wireless communication device.

BACKGROUND OF THE INVENTION

Network access has generally been limited to wired connections such as dial-up and Ethernet. In addition, users have typically had to subscribe to internet service providers (ISPs) which provided service solely over local area networks (LANs). However, as the demand for mobility increases, wireless technology has emerged. At first, wireless connectivity was developed in the form of external components, such as PCMCIA (PC) cards in order to accommodate computing systems already available to consumers. Of course, such cards were built to accommodate the interfaces of these computing devices, with the 68 pin dual row connecting interfaces being an industry standard. Then, newer computing systems began to incorporate these cards and wireless connectivity to diminish the need for extraneous devices. However, as wireless technology is rapidly improving, the cards within the systems as well as the interfaces supporting them also have become outdated. Thus, current systems on the market cannot support the best wireless technology.

SUMMARY OF THE INVENTION

In one aspect, a system for wireless communication comprises a first communication device having a first interface for interfacing with a host device and a second interface; and a second communication device configured to be coupled to the second interface of the first communication device. The first communication device and the second communication device, when coupled, form a substantially integrated device.

In one embodiment, the substantially integrated device has a substantially rectangular profile.

In one embodiment, the first communication device has an enlarged portion at one end. The enlarged portion of the first communication device may include an antenna element.

In one embodiment, the second communication device includes an enlarged portion that is congruent with the enlarged portion of the first communication device when the first communication device and the second communication device are coupled. The enlarged portion of the second communication device may include an antenna element. The enlarged portion of the second communication device may include an LED, wherein the LED is operable during data transfer. The enlarged portion of the second communication device may include a finger print detection module, the finger print detection module being operable to give access to wireless communication within the system. The enlarged portion of the second communication device may include an adapter for connection to one of serial ATA (SATA), Firewire, memory card, Ethernet, SmartCard, or serial port.

In one embodiment, the first interface is configured to be coupled to a computing device.

In one embodiment, the first interface comprises a universal PC Card connector.

In one embodiment, the first interface comprises an ExpressCard connector. In one embodiment, the second interface is one of Universal Serial Bus (USB), USB 2.0, Firewire, PCI Express serial, SmartCard, or Subscriber Identification Module (SIM).

In one embodiment, the first communication device comprises a wireless modem.

In one embodiment, the second communication device comprises an ExpressCard module in accordance with PCMCIA standards. The ExpressCard module may comprise one of a tuner, adapter or reader.

In one embodiment, the first wireless communication device includes a memory element.

In one embodiment, the first communication device has a non-conductive material lining on an inner wall interfacing the second communication device when coupled. The lining may contain a slot for securing placement of the second wireless communication device.

In one embodiment, the first communication device is configured to intercept one or more wireless signals types.

In another aspect, a wireless communication adapter for a wireless communication device comprises a body; a first interface for interfacing with a host device; and a second interface configured to be coupled to a second communication device. The body is configured to form a substantially integrated device with the second communication device when the second communication device is coupled with the second interface.

BRIEF DESCRIPTION OF THE DRAWINGS

FIG. 3 illustrates a side view of an integrated device formed with the adapter of FIG. 1 coupled to the express card insert of FIG. 2 in accordance with an embodiment of the present invention.

FIG. 4 illustrates a top view of the integrated device of FIG. 3 in accordance with an embodiment of the present invention.

FIG. 5 illustrates a top view of an adapter in accordance with another embodiment of the present invention.

FIG. 6 illustrates a top view of an express card insert in accordance with another embodiment of the present invention.

FIG. 7 illustrates a top view of an integrated device formed with the adapter of FIG. 5 coupled to the express card insert of FIG. 6 in accordance with an embodiment of the present invention.

FIGS. 8 and 9 illustrate perspective views of the integrated device of FIG. 7 in accordance with an embodiment of the present invention.

DETAILED DESCRIPTION OF CERTAIN EMBODIMENTS

Figure 2:
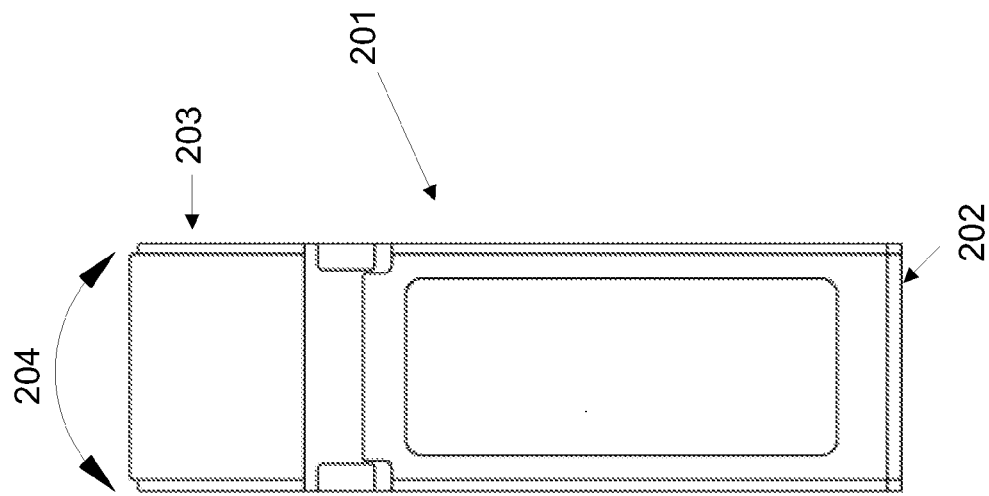
FIG. 2 illustrates a top view of an express card insert in accordance with an embodiment of the present invention.

Newer wireless systems may need to support not only several wireless interfaces, but also several modes of wireless connectivity. This is due to the emergence of improving and faster wireless network technology. For example, wireless wide-area network (WAN) standards such as GPRS offer reasonable service quality at an affordable price and have relatively wide coverage. Unfortunately, for many high data rate applications, existing WAN technologies are too slow and expensive. On the other hand, wireless local area network (WLAN) running off the traditional LAN standards such as IEEE 802.11 have proven superior for use in localized data applications. LANs are faster, cheaper, and consume less power than their WAN counterparts. However, for all practical purposes, a mobile subscriber is not afforded continuous WLAN coverage throughout the day or in all geographic areas. WLAN or LAN coverage available to a subscriber at work does not usually extend to the subscriber's home or other locations where the subscriber may be located. Therefore, it would be advantageous to provide a subscriber a way to connect to a network in any location without having to buy or utilize various communication devices.

Accordingly, there is a need to incorporate such capabilities into prior computing systems, without have to re-design them. Thus, there is a need for the current systems to be able to support various modes of accessing differing wireless networks. Currently, a user wishing to gain access to multiple systems will often carry at least two devices, each device supporting a different system (WLAN/LAN, WAN). For example, a personal computer capable of supporting a wireless modem for Institute of Electrical and Electronics Engineers (IEEE) 802.11 access and a personal digital assistant (PDA) or cellular telephone for access to a wireless broadband network such as GPRS, EDGE or GSM. Manufacturing a multitude of modem devices dependent on interface and network type greatly increases manufacturing costs. Therefore, the market would benefit from a single modem device that could conform with a standard form factor and that comprises the technology required to access a plurality of communication systems.

Embodiments of the present invention pertain to a communication device which may be coupled with a second communication device for wireless communication, for example, over a network and through usage of a computing device. In one embodiment, a first communication device, which may be an adapter and may include an antenna element, has an L-shaped body with a rectangular area open for receiving an ExpressCard or other communication device. A rectangular ExpressCard may reflect symmetry both alone and when coupled with the adapter. When the adapter and the ExpressCard are coupled, a substantially integrated device is formed. In this regard, "substantially integrated" refers to the appearance of the device formed by the coupling of the adapter and the second communication device, such as the ExpressCard.

Figure 1:
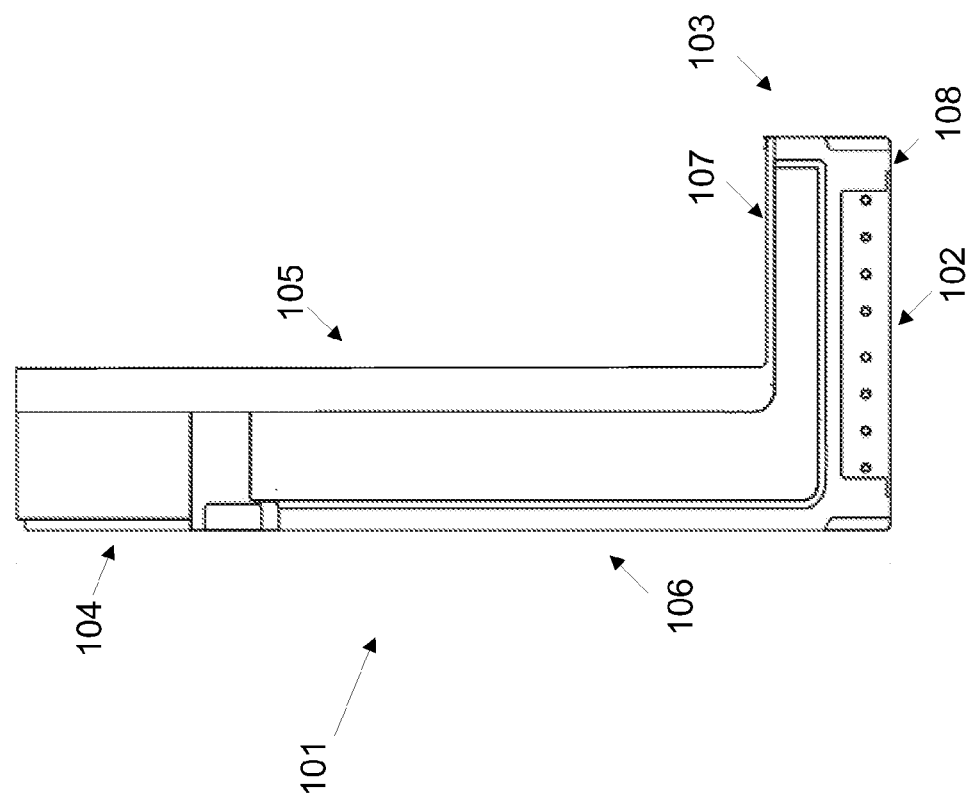
FIG. 1 illustrates a top view of an adapter in accordance with an embodiment of the present invention.

Referring to FIG. 1, a top view of an adapter 101 in accordance with an embodiment of the present invention is illustrated. In the illustrated embodiment, the adapter 101 has a body with an L-shape configuration with a base portion 103 and an arm portion 106. The base portion 103 is defined by an interior portion 107 for receiving a second communication device, and an exterior portion 108 with an interface 102. The interface 102 is configured to couple the adapter 101 to a host device (not shown) such as a personal computer (PC), a laptop or another communication device. The interface 102 may be a PCMCIA (PC) card connector, conforming to industry standard Type I, II, III or IV card slot (16-bit or 32-bit ISA bus interface) or an ExpressCard connector, USB connector, or similar connector for use with a computing device port, for example. The interior portion 107 of the base portion 103 may also include an interface for electronically coupling the second communication device received therein. The interface on the interior portion 107 may be any type of interface, such as ExpressCard, subscriber identification module (SIM) card, Universal Serial Bus (USB), USB 2.0, Firewire, PCI Express serial, SmartCard, or mini SIM.

The arm portion 106 of the adapter has an inner portion 105 which may be lined with plastic, rubber, or a similar type of non-conductive material for protection of the arm portion 106. This lining may also serve to secure placement of the second communication device when coupled to the interior portion 107. Accordingly, the lining along the inner portion 105 of the arm portion 106 may be ridged or slotted to form an inner channel, or slot area, to receive a portion (or edge) of the second communication device. Similarly, the interior portion 107 of the base portion 103 may include a protective layer of a non-conductive material as well. The interior portion 107 of the base portion 103 may be configured with a slot portion which includes the above-described interface for receiving an ExpressCard or other detachable device.

One end of the arm portion 106 may include an enlarged portion 104. In this regard, the enlarged portion 104 has a top surface which is raised relative to the remainder of the arm portion 106 and the base portion of the adapter 101. The enlarged portion 104 may only include a small portion of the arm portion 106 and may be configured to enclose an antenna for receiving wireless communication signals from varying networks, for example. The enlarged portion 104 may be larger or smaller, depending on the size necessary for the antenna element.

In one embodiment, the interface 102 of the exterior portion 108 is a PC connector, and the interface of the interior portion 107 is an ExpressCard interface. FIG. 2 illustrates an example of a second communication device which may be received in the interface of the interior portion 107. In various embodiments, the second communication device 201 to be received in the interior portion 107 may be an ExpressCard module in accordance with PCMCIA standards. In other embodiments, the second communication device 201 may be a subscriber identification module (SIM) card, mini-SIM card, memory card, SmartCard, or similar type of information card and/or communication device that may be interfaced with the first communication device, or adapter 101 illustrated in FIG. 1.

In one embodiment, the second communication device 201 includes an interface 202 for electronically coupling the second communication device 201 to a communication device such as the adapter 101 (or first communication device) described above with reference to FIG. 1. The interface 202 of the second communication device 201 may be configured to be complimentary to the interface of the interior portion 107 of the adapter 101 of FIG. 1 or of any other first communication device with which the second communication device 201 is desired to be coupled.

In one embodiment, the second communication device 201 includes an enlarged portion 203. The enlarged portion 203 may be configured to compliment a corresponding enlarged portion of a first communication device with which the second communication device 201 is desired to be coupled. For example, the enlarged portion 203 of the second communication device 201 may complement the enlarged portion 104 of the adapter 101 of FIG. 1. The enlarged portion 203 of the second communication device 201 may include a secondary antenna element capable of receiving a wireless network signal. In other embodiments, the enlarged portion 203 of the second communication device 201 may include a fingerprint detection module configured to give a user access to a specific wireless communication network or access to the second communication device 201, for example. In yet another embodiment, the enlarged portion 203 may include an LED that is active, or lit, during transmission of data through either the first communication device or the second communication device 202. Further, the second communication device 201 may include a secondary adapter having a module (not shown) capable of receiving a serial ATA (SATA), Firewire, memory card, Ethernet, SmartCard, or serial port located at the top raised portion 203.

In addition, the second communication device 201 may include plastic, rubber or another type of non-conductively lined edge portions 204, similar to that of the material lining the inner portion 105 of the arm portion 106 of the adapter 101 of FIG. 1. The edge portions 204 of the second communication device 201 may include a singular notch portion for being received by the ridged, slot portion of the inner portion 105 of the arm portion 106 of the adapter 101.

Referring now to FIGS. 3 and 4, a system including the adapter 101 coupled to the second communication device 201 is described. FIG. 3 illustrates a side view of the adapter 101 coupled to the second communication device 201 to form a substantially integrated device 301. FIG. 4 illustrates a frontal view of the substantially integrated device 301. In one embodiment, such as the embodiment illustrated in FIGS. 3 and 4, the second communication device 201 and the assembled integrated device 301 reflect similar symmetry. Accordingly, the adapter 101 and second communication device 201 are of approximately the same thickness throughout the bodies of the each, as well as at the enlarged portions 104, 203. One end of the assembled integrated device 301 includes the interface 102 of the adapter 101 for interfacing with, for example, a host device. The interface 102 may include allow connection to a 16- or 32-bit bus. As illustrated in FIGS. 3 and 4, one or both of the enlarged portions 104, 203 may include an antenna element for wireless communication. In other embodiments, the enlarged portion 203 of the second communication device 201 may include an LED which becomes visible during data transmission. Alternatively, the enlarged portion 203 of the second communication device 201 may include a secondary adapter for Ethernet, SD card, mini SD card, serial port, or similar port interface. In another embodiment, the enlarged portion 203 of the second communication device 201 may include no internal elements and may only be enlarged so that, when the second communication device 201 is coupled with the adapter 101, the enlarged portion 203 is congruent with the enlarged portion 104 of the adapter 101, or first communication device, in order to provide symmetry and to form a substantially integrated device.

Accordingly, in accordance with the illustrated embodiment, the second communication device 201, which may be an ExpressCard, is fitted within the L-shaped form of the adapter 101 against the lining material 105 of the arm portion of the adapter. The lining material 105 of the adapter 101 may include a ridge, or slot region, for secure placement of the second communication device 201 within the adapter 101. The interface portion 202 of the second communication device 201 also securely fits for coupling with the interface 107 of the adapter 101. Further, the receiving interface 107 of the adapter 101 may be within a slot or gap region of the adapter for secure placement and fitting of the second communication device 201. Thus, for congruence, the interface portion 202 of the second communication device 201 may be slightly thinner in width than the remaining central portion of the device. The interface may be an ExpressCard, SIM card, USB port, or a similar interface. When assembled, the adapter 101 and second communication device create a flush surface throughout the body and at the enlarged portions 104, 203 to form a substantially integrated device.

Thus, in accordance with embodiments of the present invention, the substantially integrated device 301 formed by the coupling of the adapter 101 and the second communication device 201 may be substantially rectangular in shape, similar in symmetry to an ExpressCard. In various embodiments, the "substantially rectangular" configuration may include variations, such as a decorative design across or a curvature across one edge of the substantially integrated device 301. The enlarged portions 104, 203 of the adapter 101 and the second communication device 201 may be flat while the two devices are flush when coupled. In one embodiment, the interface 102 of the adapter 101 may be a PCMCIA (PC) card connector, conforming to the industry standard Type I, II, III or IV card slot (16-bit or 32-bit ISA bus interface) or an ExpressCard connector, USB connector, or similar connector for use with a computing device. Accordingly, in one embodiment, when the adapter 101 and the second communication device 201 are coupled, the substantially integrated device 301 forms a complete PC card.

Referring now to FIGS. 5-9, an adapter assembly in accordance with another embodiment of the present invention is illustrated. Referring first to FIG. 5, a top view of an adapter 501 in accordance with another embodiment of the present invention is illustrated. In the illustrated embodiment, the adapter 501 has a body with a substantially U-shape configuration with a base portion 503 and arm portions 506a, 506b. In the embodiment illustrated in FIG. 5, one arm portion 506b is illustrated as being wider than the other arm portion 506a. In other embodiments, the relative sizes or widths of the arm portions 506a, 506b may be different.

The base portion 503 is defined by an interior portion 507 for receiving a second communication device, and an exterior portion 508 with an interface 502. The interface 502 is configured to couple the adapter 501 to a host device (not shown) such as a personal computer (PC), a laptop or another communication device. The interior portion 507 of the base portion 503 may also include an interface for electronically coupling a second communication device received therein.

The arm portions 506a, 506b of the adapter have inner portions 505a, 505b which may be lined with plastic, rubber, or a similar type of non-conductive material for protection of the arm portions 506a, 506b, respectively. As described above with reference to the embodiment of FIGS. 1-4, this lining may also serve to secure placement of the second communication device when coupled to the interior portion 507. Accordingly, the lining along the inner portions 505a, 505b of the arm portions 506a, 506b, respectively, may be ridged or slotted to form an inner channel, or slot area, to receive a portion (or edge) of the second communication device. The interior portion 507 of the base portion 503 may be configured with a slot portion which includes the above-described interface for receiving an ExpressCard or other detachable device.

Similar to the embodiment described above with reference to FIGS. 1-4, in the embodiment of FIGS. 5-9, one end of the arm portions 506a, 506b may include an enlarged portion 504.

FIG. 6 illustrates an example of a second communication device which may be received in the interface of the interior portion 507 of the adapter 501 of FIG. 5. In one embodiment, the second communication device 601 includes an interface 602 for electronically coupling the second communication device 601 to a communication device such as the adapter 501 (or first communication device) described above with reference to FIG. 5. The interface 602 of the second communication device 601 may be configured to be complimentary to the interface of the interior portion 507 of the adapter 501 of FIG. 5 or of any other first communication device with which the second communication device 601 is desired to be coupled.

In one embodiment, the second communication device 601 includes an enlarged portion 603. The enlarged portion 603 may be configured to compliment a corresponding enlarged portion of a first communication device with which the second communication device 601 is desired to be coupled. For example, the enlarged portion 603 of the second communication device 601 may complement the enlarged portion 504 of the adapter 501 of FIG. 5.

In addition, the second communication device 601 may include plastic, rubber or another type of non-conductively lined edge portions 604, similar to that of the material lining the inner portions 505a, 505b of the arm portions 506a, 506b, respectively, of the adapter 501 of FIG. 5.

Referring now to FIG. 7, a top view of the adapter 501 coupled to the second communication device 601 to form a substantially integrated device 701 is illustrated. In one embodiment, such as the embodiment illustrated in FIG. 7, the second communication device 601 and the assembled integrated device 701 reflect similar symmetry. Accordingly, the adapter 501 and second communication device 601 are of approximately the same thickness throughout the bodies of the each, as well as at the enlarged portions 504, 603. One end of the assembled integrated device 701 includes the interface 502 of the adapter 501 for interfacing with, for example, a host device.

Accordingly, in accordance with the illustrated embodiment, the second communication device 601, which may be an ExpressCard, is fitted within the U-shaped form of the adapter 501 against the lining material on each of the inner portions 505a, 505b of the arm portions 506a, 506b of the adapter 501. The lining material on each of the inner portions 505a, 505b may include a ridge, or slot region, for secure placement of the second communication device 601 within the adapter 501. The interface portion 602 of the second communication device 601 also securely fits for coupling with the interface 507 of the adapter 501.

In various embodiments, the adapter 501 may be provided with a latching mechanism to secure the coupling of the second communication device 601. In the exemplary embodiment of FIGS. 5-9, the latching mechanism includes a cross bar 508, most clearly illustrated in FIGS. 8 and 9. In the illustrated embodiment, the cross bar 508 is hinged on one end to an arm portion 506b and includes a latch 509 at the other end. The latch 509 may be configured to engage a corresponding feature on the opposite arm portion 506a. When the latch 509 is engaged to the opposite arm portion 506a, a body portion 510 of the cross bar may engage the second communication device 601. In other embodiments, the latch 509 or another latch-type feature of the cross bar 508 may be configured to engage the second communication device 601.

While particular embodiments of the present invention have been disclosed, it is to be understood that various different modifications and combinations are possible and are contemplated within the true spirit and scope of the appended claims. There is no intention, therefore, of limitations to the exact abstract and disclosure herein presented.

What is claimed is:

1. A system for wireless communication comprising:
a first communication device having a first interface for interfacing with a host device, a second interface, a first antenna element for communication with a first network, and an enlarged portion at one end, the enlarged portion including the first antenna element; and
a second communication device, including a second antenna element for communication with a second network and an enlarged portion, configured to be coupled to the second interface of the first communication device,
wherein the first communication device and the second communication device, when coupled, form a substantially integrated device and wherein the enlarged portion of the second communication device is congruent with the enlarged portion of the first communication device.

2. The system of claim 1, wherein the substantially integrated device has a substantially rectangular profile.

3. The system of claim 1, wherein the enlarged portion of the second communication device includes the second antenna element.

4. The system of claim 1, wherein the enlarged portion of the second communication device includes an LED, wherein the LED is operable during data transfer.

5. The system of claim 1, wherein the enlarged portion of the second communication device includes a fingerprint detection module, the fingerprint detection module being operable to give access to wireless communication within the system.

6. The system of claim 1, wherein the enlarged portion of the second communication device includes an adapter for connection to one of serial ATA (SATA), Firewire, memory card, Ethernet, SmartCard, or serial port.

7. The system of claim 1, wherein the first interface is configured to be coupled to a computing device.

8. The system of claim 1, wherein the first interface comprises a universal PC Card connector.

9. The system of claim 1, wherein the first interface comprises an ExpressCard connector.

10. The system of claim 1, wherein the second interface is one of Universal Serial Bus (USB), USB 2.0, Firewire, PCI Express serial, SmartCard, or Subscriber Identification Module (SIM).

11. The system of claim 1, wherein the first communication device comprises a wireless modem.

12. The system of claim 1, wherein the second communication device comprises an ExpressCard module in accordance with PCMCIA standards.

13. The system of claim 12, wherein the ExpressCard module comprises one of a tuner, adapter or reader.

14. The system of claim 1, wherein the first communication device includes a memory element.

15. The system of claim 1, wherein the first communication device has a non-conductive material lining on an inner wall interfacing the second communication device when coupled.

16. The system of claim 15, wherein the lining contains a slot for securing placement of the second wireless communication device.

17. The system of claim 1, wherein the first communication device is configured to intercept one or more wireless signal types.

18. The system of claim 1, wherein the first communication device has an L-shaped configuration.

19. The system of claim 1, wherein the first communication device has a U-shaped configuration.

20. The system of claim 1, wherein the first communication device includes a latching mechanism configured to secure coupling of the second communication device.

* * * * *